United States Patent Office.

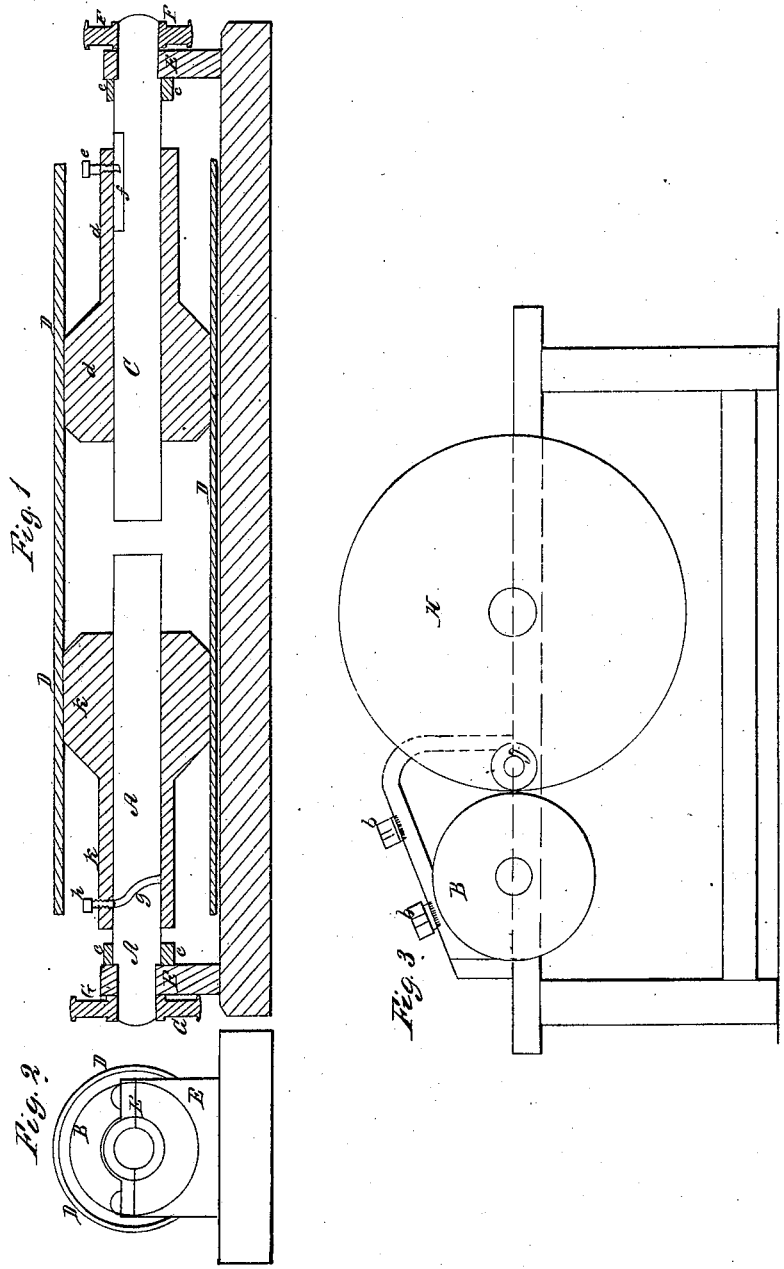

SAMUEL G. LADD AND GEORGE W. CROWN, OF LOWELL, MASSACHUSETTS.

Letters Patent No. 63,165, dated March 26, 1867.

IMPROVEMENT IN MACHINES FOR GRINDING CARDS.

*The Schedule referred to in these Letters Patent and making part of the same.*

TO ALL WHOM IT MAY CONCERN:

Be it known that we, SAMUEL G. LADD and GEORGE W. CROWN, both of Lowell, in the county of Middlesex, and State of Massachusetts, have invented certain new and useful improvements in the Machinery or Apparatus which is used for Grinding the Card Teeth of Carding Cylinders or the top flats of carding engines, of which the following is a full, clear, and exact description, reference being had to the accompanying drawings, making part of this specification, in which—

Figure 1 is a central longitudinal section.

Figure 2, an end elevation; and

Figure 3 represents a transverse section of our grinder cylinder B, as applied to a frame for grinding the card teeth of a large cylinder, or a small cylinder, or the top flats of carding engines.

Our invention consists, first, in the employment of two separate central shafts, A and C, arranged within the hubs $k$ and $d$ of the grinder cylinder D, when the said hubs are made to slide longitudinally on the central shafts, which shafts have no longitudinal motion, but are made to rotate in suitable bearings or journal-boxes near their outer ends. Our invention also consists in the employment of a lateral cam on the shaft A, or a lateral cam-groove, $g$, formed in the substance of said shaft, with a screw, $h$, or other suitable device, passing through one side of the hub $k$, or connected therewith, to engage with the lateral cam or the cam groove $g$, to produce a positive, even, and equal longitudinal reciprocating motion to the grinder cylinder D when rotating. And our invention consists in providing a longitudinal key-way or groove, $f$, in the side of the shaft C, or in the substance of the hub $g$ next to the shaft, and a screw, $e$, or other suitable device passing through the side of the hub $g$ into the key-way, or projecting from the periphery of the shaft and entering the groove or key-way in the hub, for the purpose of connecting the hub and shaft, so that when the shaft rotates the hub and cylinder shall also rotate; but the hub must slide longitudinally on the shaft, while both shaft and hub and also the cylinder rotate together. A pulley, F, is fitted and fastened to the outer end of the shaft C, and a pulley, G, to the outer end of the shaft A. Outside of the bearings E collars $c$ are fitted and fastened to each of the shafts A and C inside of the bearings E. These pulleys and collars prevent any longitudinal reciprocation of the shafts when said shafts, or either of them, are rotating. The pulley F provides for the reception of power and rotary motion to the shaft C and the cylinder by a belt or band running from a suitable rotating drum or pulley on to the pulley F. If the shaft C and the cylinder were rotated at proper speed to grind card teeth, and the shaft A was at rest, the longitudinal reciprocating motion of the cylinder would be as rapid as its rotation, which would be liable to injure the machine and injure or spoil the card teeth. To prevent any such injury to the machine or the card teeth we run a belt from a suitable rotating drum or pulley on to the pulley G, on the outer end of the shaft A, and drive the latter shaft considerably slower, or a less number of revolutions per minute, than the shaft C and the cylinder for the rotary motion of the shaft C, and the cylinder connected with the hubs $d$ and $k$ causes the end of the screw $h$, which enters the cam-groove $g$, to follow said cam-groove round the shaft A and move the cylinder longitudinally once each way at every revolution of the shaft C and the cylinder when the shaft A is at rest. Any rotary motion of the shaft A, which contains the cam-groove $g$, diminishes the reciprocating motion of the cylinder, and, a proper rotary motion of the shaft A, either slower or faster than the shaft C, will produce the desired longitudinal reciprocation of the cylinder, and any change in the reciprocating action of said cylinder may be effected by increasing or diminishing the velocity or speed of the shaft A, as above stated. By the use of our improvements the teeth of card cylinders may be ground more evenly and nearer to the needle point than by any card grinder now in use, the grinder cylinder being enough longer than the card cylinder to allow of ample reciprocation and still continue its equal and even grinding operation on the teeth the whole length of the card cylinder, doing its work so perfectly as to obviate the necessity of strickling the card after grinding, and leaving no wire edges on the pointed ends of the teeth. Our improved card grinder is well adapted to grinding large cylinders H or small cylinders I, or top flats $b$, the latter of which are moved across the top of the grinder cylinder transversely, all as shown in fig. 3 of the drawings; whereas, in the use of the card grinder patented by Jonathan Parker, March 3, 1857, and improved and patented by Charles Hardy, February 5, 1861, in the former invention the short grinder cylinder performs more grinding at the ends of the card cylinder than at the middle portion, and leaves the surface rounded from end to end. In the latter invention nd improvement the shafts G and E are so long as to spring and allow the grinder D to sag when in the middle f the traversing shaft, and thereby grind the toothed surface hollow from end to end and otherwise very uneven. n the use of any of the ordinary card grinders the lateral reciprocation of the grinder cylinder is unequal, ence imperfect in the operation, grinding more in some places than in others, and causing the card to perform nperfect work. In grinding the main cylinder of a carding engine we place the grinder cylinder in adjustable earings on the frame of the carding engine, in close proximity to the points of the card teeth, and apply power nd motion, by belts from some pulleys on the carding engine, on to the pulleys F and G of the grinder cylinder. n grinding the smaller carding cylinders the grinder cylinder is placed in adjustable bearings on a grinder ame constructed and arranged for grinding the teeth of small cylinders and top flats. The small card cylinders rotate side by side with the grinder cylinder, and near enough together for the grinder cylinder, which is covered on its periphery with coarse emery, to grind the points of the card teeth on said small cylinder or cylinders. The points of the card teeth on the top flats of carding engines are ground by moving the top flats (one a time) transversely across the upper surface of the grinder cylinder on guides, shown in fig. 3, when said rinder cylinder is rotating, and reciprocating longitudinally. It will therefore be understood that our improved ard grinder may be used for grinding the teeth of large card cylinders or small cylinders, or of the top flats, nd it can be changed from one frame to another and carry with it the best reciprocating device for the purpose ver before used.

Having fully described our invention and its operation, what we claim as new, and desire to secure by etters Patent of the United States, is—

The two central shafts A and C, revolving at different velocities, causing the grinding cylinder to revolve y means of the hub $d$, and to reciprocate longitudinally by means of the hub $k$, groove $g$, pin $h$, slot $f$, and pin in the manner and for the purpose substantially as described.

S. G. LADD,
GEO. W. CROWN.

Witnesses:
ROSWELL BLANCHARL
C. C. LADD.